United States Patent
Nasu

(10) Patent No.: US 12,056,166 B2
(45) Date of Patent: Aug. 6, 2024

(54) SYSTEM AND METHOD FOR SUPPORTING CORPORATE BUSINESS

(71) Applicant: Hitachi, Ltd., Tokyo (JP)

(72) Inventor: Hiroaki Nasu, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 18/301,356

(22) Filed: Apr. 17, 2023

(65) Prior Publication Data

US 2024/0070174 A1 Feb. 29, 2024

(30) Foreign Application Priority Data

Aug. 31, 2022 (JP) ................................ 2022-138604

(51) Int. Cl.
G06F 16/31 (2019.01)
G06F 16/383 (2019.01)

(52) U.S. Cl.
CPC .......... *G06F 16/313* (2019.01); *G06F 16/383* (2019.01)

(58) Field of Classification Search
CPC .............................. G06F 16/313; G06F 16/383
See application file for complete search history.

(56) References Cited

U.S. PATENT DOCUMENTS

2006/0122849 A1* 6/2006 Masuyama ........... G06F 16/353
707/E17.09

FOREIGN PATENT DOCUMENTS

JP 6718552 B1 7/2020

* cited by examiner

*Primary Examiner* — Baoquoc N To
(74) *Attorney, Agent, or Firm* — Volpe Koenig

(57) ABSTRACT

A corporate business support system includes a population forming unit, a change keyword extraction unit, a co-occurrence word extraction unit, and an output unit. The population forming unit forms a population for each type of element of 3C (customer, company and competitor) and for each of predetermined periods. The change keyword extraction unit extracts a change keyword based on the formed populations. The co-occurrence word extraction unit extracts a change keyword included in both populations as a co-occurrence word among the extracted change keywords in a combination of a company and a customer and a combination of the company and the competitor which are elements of 3C. The output unit outputs text including the extracted co-occurrence word in association with one of the combination of the company and a customer and a combination of a company and a competitor.

10 Claims, 12 Drawing Sheets

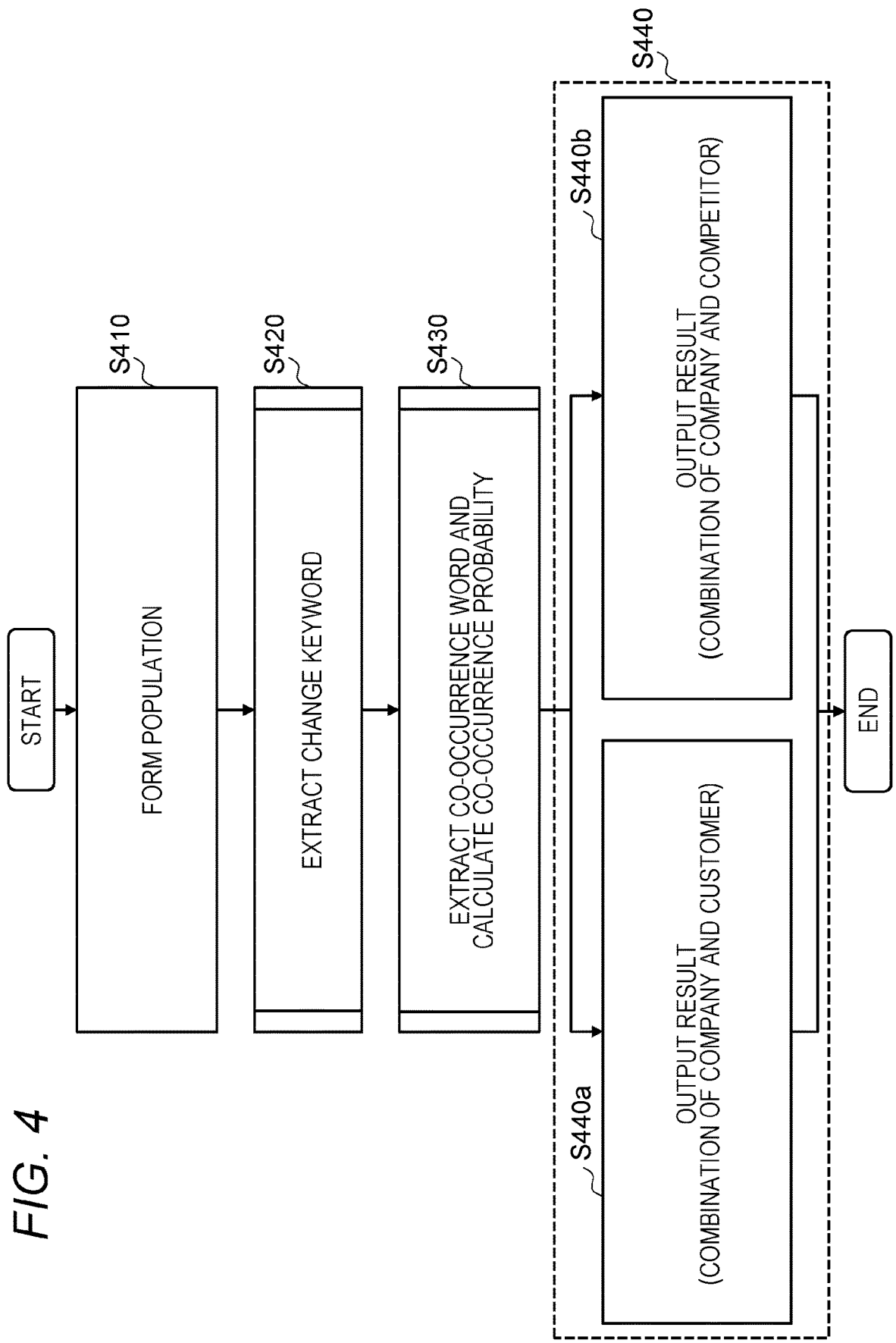

| PROPOSAL No | CUSTOMER NAME | DIRECTIVITY KW1 | DIRECTIVITY KW2 | DIRECTIVITY KW3 | PERIOD | DATE AND TIME |
|---|---|---|---|---|---|---|
| 1 | COMPANY A | ENVIRONMENT | POWER CONSUMPTION | ENERGY SAVING | 10 YEARS | 2022/05/25 15:30:00 |
| 2 | COMPANY B | | | | | |
| ... | | | | | | |

| PROPOSAL No | COMPANY NAME | SEARCH PHRASE 1 | SEARCH PHRASE 2 | SEARCH PHRASE 3 | PERIOD | DATE AND TIME |
|---|---|---|---|---|---|---|
| 1 | COMPANY C | TECHNOLOGY X | FUNCTION Y | PROBLEM Z | 10 YEARS | 2022/05/25 15:30:00 |
| 2 | | | | | | |
| ... | | | | | | |

| PROPOSAL No | COMPETITOR NAME | SEARCH PHRASE 1 | SEARCH PHRASE 2 | SEARCH PHRASE 3 | PERIOD | DATE AND TIME |
|---|---|---|---|---|---|---|
| 1 | COMPANY D | TECHNOLOGY P | FUNCTION Q | | 10 YEARS | 2022/05/25 15:30:00 |
| 2 | | | | | | |
| ... | | | | | | |

| PROPOSAL No | SEARCH FORMULA | POSTING SOURCE URL | TEXT | EXTRACTED WORD | DIRECTIVITY KW | DATE |
|---|---|---|---|---|---|---|
| 1 | COMPANY A OR ENVIRONMENT OR POWER CONSUMPTION OR ENERGY SAVING | https:// | XXXX ENVIRONMENT XXXXXXXX. XXXXXXXXXX XXXXXXXXX XXXXXXXX XX. | NOUN A NOUN B ... | ENVIRONMENT | 2020/ 10/11 |
| 1 | COMPANY A OR ENVIRONMENT OR POWER CONSUMPTION OR ENERGY SAVING | https:// | XXX ENERGY SAVING XXXXX. XXXXXXXXX. POWER CONSUMPTION XXXX. | NOUN A NOUN C ... | ENERGY SAVING POWER CONSUMPTION | 2021/ 03/02 |
| ⋮ | | | | | | |

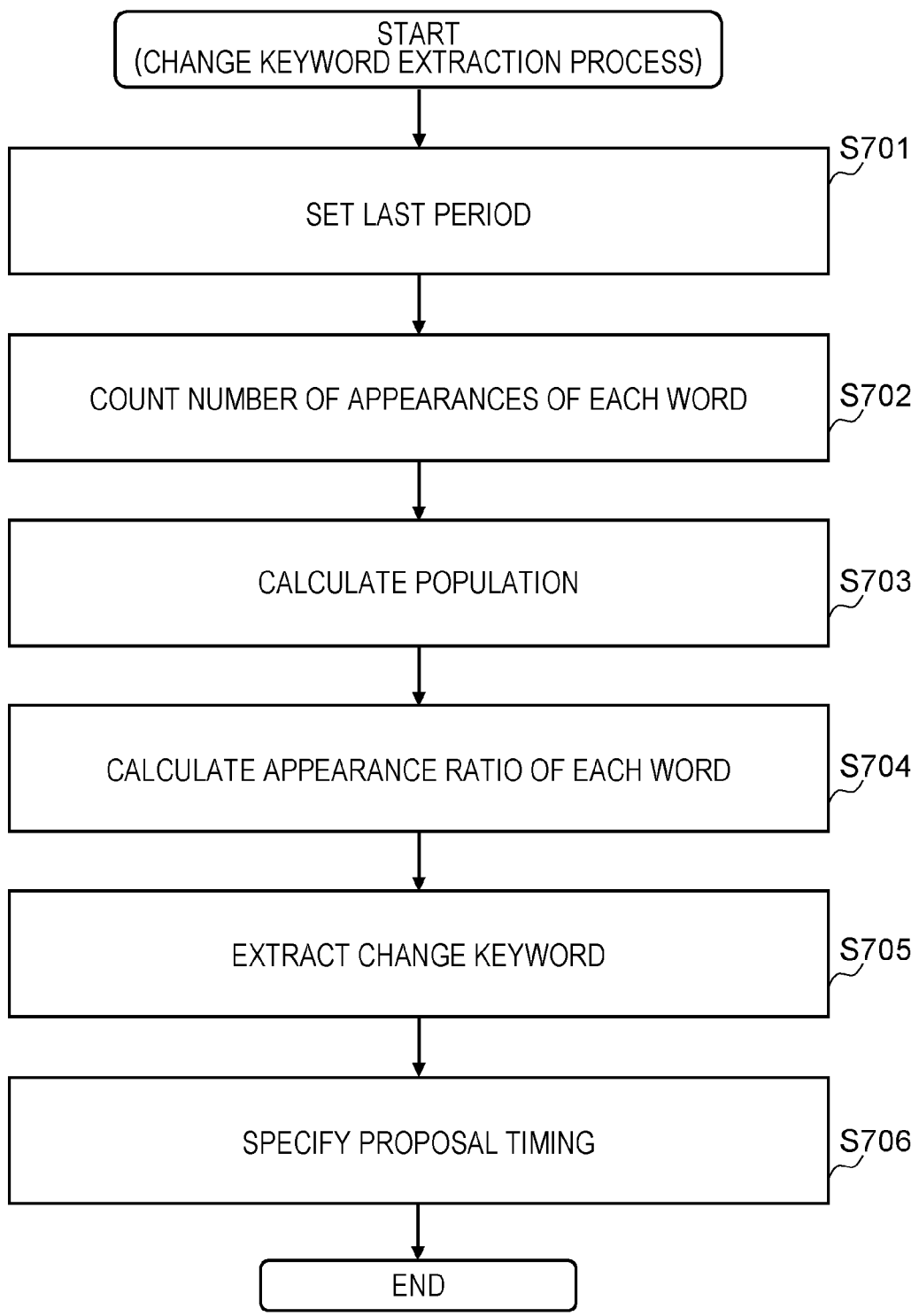

| PROPOSAL No | CUSTOMER NAME | PERIOD | LAST PERIOD |
|---|---|---|---|
| 1-1 | COMPANY A | 10 YEARS | 1 YEAR |
| 1-2 | COMPANY A | 10 YEARS | 3 YEARS |
| ... | | | |

| PROPOSAL No | WORD | NUMBER OF APPEARANCES WITHIN PERIOD | LAST NUMBER OF APPEARANCES | PERIOD APPEARANCE RATIO | LAST APPEARANCE RATIO | RATE DIFFERENCE |
|---|---|---|---|---|---|---|
| 1-1 | NOUN C | 3445 TIMES | 535 TIMES | 91.8% | 87.8% | −4 SECOND |
| 1-1 | NOUN B | 234 TIMES | 0 TIMES | 6.2% | - | |
| 1-1 | NOUN A | 75 TIMES | 74 TIMES | 1.9% =75/3754 | 12.1% =74/609 | +10.2 FIRST |
| | | | | | | |
| | | | | (STEP S704) | | |

 

3754 TIMES    609 TIMES

ADD UP NUMBERS OF APPEARANCES OF RESPECTIVE WORDS AND CALCULATE EACH OF POPULATIONS IN CRAWLING TARGET PERIOD AND LAST PERIOD
(STEP S703)

SPECIFY, AS CHANGE KEYWORD, "NOUN A" OF WHICH RATE OF FREQUENCY OF NUMBER OF APPEARANCES IN POPULATION OF LAST 1 YEAR IS INCREASING AS COMPARED TO THE RATE IN POPULATION OF PAST 10 YEARS
(STEP S705)

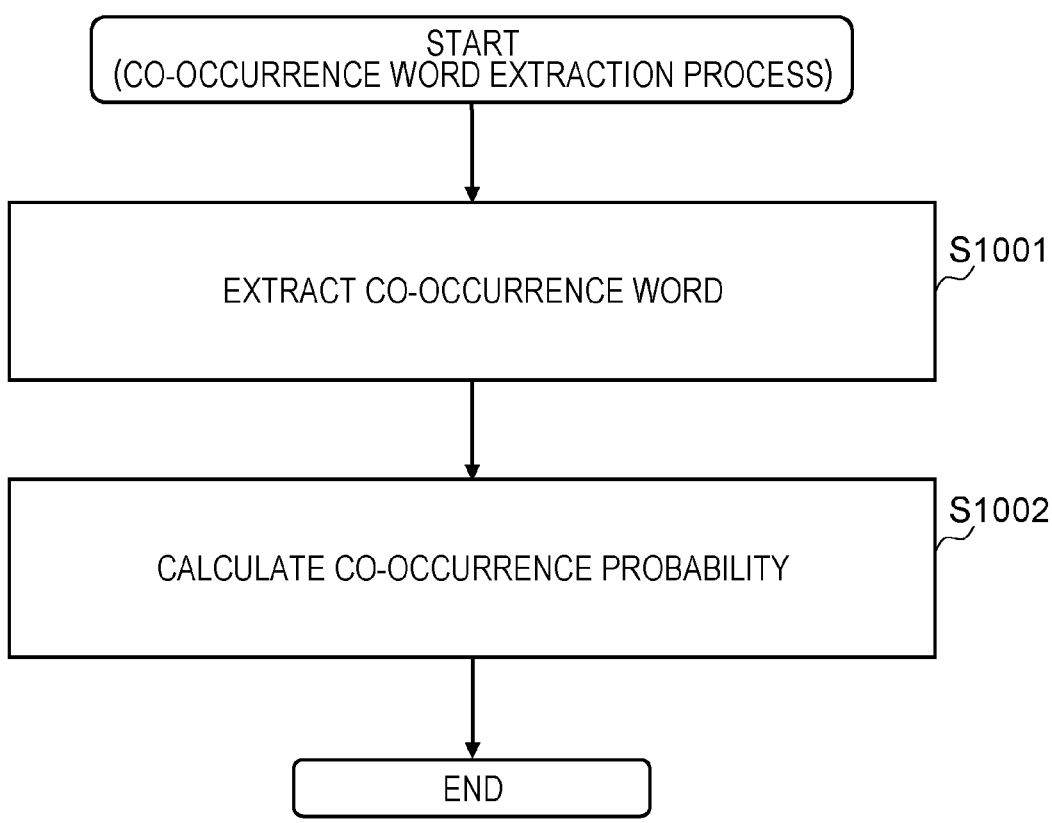

FIG. 11
1100

| PROPOSAL No | CUSTOMER WORD | COMPANY WORD | DIRECTIVITY KEYWORD | COMPANY SEARCH PHRASE | CO-OCCURRENCE PROBABILITY | TEXT POSTING SOURCE URL |
|---|---|---|---|---|---|---|
| 1-1 | NOUN A FIRST | NOUN X FIRST |  |  | 14.1% | https:// https:// https:// https:// |
| 1-1 | NOUN A FIRST | NOUN Y SECOND | ENVIRONMENT, POWER CONSUMPTION, ENERGY SAVING | FUNCTION F, FUNCTION G | 15.5% HIGH | https:// https:// https:// https:// |
| 1-1 | ... |  |  |  |  |  |

PRESENTING TEXT IN WHICH WORD PAIR WITH HIGH CO-OCCURRENCE PROBABILITY IS DESCRIBED IN ORDER FROM HIGH RANK

| PROPOSAL No | COMPETITOR WORD | COMPANY WORD | COMPETITION SEARCH PHRASE | COMPANY SEARCH PHRASE | CO-OCCURRENCE PROBABILITY | TEXT POSTING SOURCE URL |
|---|---|---|---|---|---|---|
| 1-1 | NOUN L FIRST | NOUN X FIRST |  |  | 18.9% HIGH | https:// https:// https:// https:// |
| 1-1 | NOUN M FIRST | NOUN Y SECOND | ENVIRONMENT, POWER CONSUMPTION, ENERGY SAVING | FUNCTION F, FUNCTION G | 0.3% LOW | https:// |
| 1-1 | ... |  |  |  |  |  |

PRESENTING TEXT IN WHICH WORD PAIR WITH HIGH CO-OCCURRENCE PROBABILITY IS DESCRIBED IN ORDER FROM HIGH RANK
PRESENTING TEXT IN WHICH WORD PAIR WITH LOW CO-OCCURRENCE PROBABILITY IS DESCRIBED IN ORDER FROM LOW RANK

PROPOSAL No 1-1

| CUSTOMER NAME | COMPANY NAME | COMPETITOR NAME |
|---|---|---|
| COMPANY A | COMPANY C | COMPANY D |

| WHOLE PERIOD | CHANGE PERIOD |
|---|---|
| 10 YEARS | 1 YEAR |

CUSTOMER: NOUN A, 75 TIMES IN WHOLE PERIOD → 74 TIMES IN LAST PERIOD
COMPANY: NOUN X, ○ TIMES IN WHOLE PERIOD → △ TIMES IN LAST PERIOD

URL : https://
XXXXXXXXXXXXXXXXXXXXXXXXX NOUN A BECOMES IMPORTANT.
XXXXXXXXXXXXXXXXXXXXXXXXXXXXXXXXXXXXXXXXXXXXX.
XX USING NOUN X WITH WHICH FUNCTION F IS IMPLEMENTED, XXXXXXXXXXX SINCE ENVIRONMENT LOAD IS REDUCED XXXXXXXXXXXX.
XXXXXXXXXXXX POWER CONSUMPTION CAN BE REDUCED.

DISPLAY TEXT INCLUDING WORD PAIR HAVING HIGH OR LOW CO-OCCURRENCE PROBABILITY IN LIST FORM IN DESCENDING ORDER OF NUMBER OF DIRECTIVITY KEYWORDS OR COMPANY SEARCH PHRASES.
HIGHLIGHT AND DISPLAY WORDS WITH BACKGROUND COLOR.

URL : https://
XXXXXXXXXXXXXXXXXXXXXXXXXXXXXX.
XXXXXXXXXXXXXXXXXXXXXXXXXXXXXXXXXXXXXX.
XXXXXXXXXXXXXXXXXXXXXXXXXXXXXXXXXXXXXXXXXXXXX.

URL : https://
XXXXXXXXXXXXXXXXXXXXXXXXXXXXXXXXXXXXXXXXXXXXXX.
XXXXXXXXXXXXXXXXXXXXXXXXXXXXXXXXXXXXXXXXXXXXXX.
XXXXXXXXXXXXXXXXXXXXXXXXXXXXXXXXXXXXX.

SYSTEM AND METHOD FOR SUPPORTING CORPORATE BUSINESS

BACKGROUND OF THE INVENTION

1. Field of the Invention

The present invention relates to a computer technology for supporting corporate business.

2. Description of the Related Art

Today's rise in data sciences has led to dramatic advances in various technologies for supporting corporate activities. In particular, examples of technical fields in which great progress has been made include various technologies related to marketing (which means analysis of market, planning and business for products or services, and the like) (hereinafter, collectively referred to as a "marketing technology") (for example, JP 6718552 B1).

SUMMARY OF THE INVENTION

The application areas of the marketing technology (MarTech) have expanded as marketing technology has progressed. In this way, in such circumstances, one of application areas that has recently attracted attention is business-to-business (BtoB) marketing for inter-company transactions.

BtoB marketing is a type of marketing carried out by corporations such as a companies or groups equivalent to companies as part of the business activities (hereinafter referred to as "corporate business") conducted by the corporations or similar organizations targeted at other companies or groups equivalent to companies. Compared to business activities for targeting individuals (hereinafter referred to as "personal business"), corporate business has a wide variety of operations depending on how target products are manufactured, transported, and sold. Under such circumstances, support for corporate business has been mainly provided manually. However, tightening of information security has recently progressed, supporters cannot sufficiently collect information necessary in sites of corporate business of support destinations, and it is difficult to appropriately support the corporate business manually. Therefore, it is difficult to apply marketing technologies of the related art which have progressed mainly through supporting of B-to-C (business-to-consumer) marketing carried out as parts of personal sales to support corporate business.

Therefore, it is desired to create new marketing technologies that can appropriately support corporate business. In particular, there are demands for next-generation marketing technologies that can quickly ascertain changes in analysis targets such as own companies, customers, competitor, markets, or societies, discover potential demands of customers, markets, or societies, or contribute to development of new customers or new markets.

In view of the foregoing problems, an object of the present invention is to provide a technology capable of appropriately supporting corporate business.

A system includes a population forming unit, a change keyword extraction unit, a co-occurrence word extraction unit, and an output unit. The population forming unit forms a population for each type of element of 3C (customer, company and competitor) and for each of predetermined periods. The change keyword extraction unit extracts a change keyword based on the formed populations. The co-occurrence word extraction unit extracts a change keyword included in both populations as a co-occurrence word among the extracted change keywords in a combination of a company and a customer and a combination of the company and the competitor which are elements of 3C. The output unit outputs text including the extracted co-occurrence word in association with one of the combination of the company and a customer and a combination of a company and a competitor. The population is a set of text and words. In each population, the text includes a predetermined search phrase related to at least one of the customer, the company, and the competitor which are the elements of the 3C. The word is a noun extracted from the text in the population. The change keyword extraction unit calculates an appearance ratio indicating a ratio of a number of each of the extracted words to a total number of the extracted words, calculates, as a change degree, a rate of an appearance ratio in a second population formed for a second predetermined period that is a relatively short time to an appearance ratio in a first population formed for a first predetermined period that is a relatively long time, and extracts the change keyword from a word in descending order of the change degree as the change keyword that has a large change and is to be noticed in a corporate business proposal.

In addition, the problem disclosed in the present application and the method of solving the problem will be apparent in description of the embodiment for carrying out the invention and the drawings.

According to the present invention, corporate business can be appropriately supported.

BRIEF DESCRIPTION OF THE DRAWINGS

FIG. 4 illustrates an example of a flow of entire processing performed in the embodiment;

FIG. 5A illustrates a configuration example of a search condition table;

FIG. 5B illustrates a configuration example of a search condition table;

FIG. 5C illustrates a configuration example of a search condition table;

FIG. 6 illustrates a configuration example of a population table;

FIG. 7 illustrates an example of a flow of a change keyword extraction process;

FIG. 8A illustrates a configuration example of a change keyword table;

FIG. 8B illustrates a configuration example of the change keyword table;

FIG. 10 illustrates an example of a flow of a co-occurrence word extraction process;

FIG. 11 illustrates a configuration example of a co-occurrence probability table; and FIG. 12 illustrates an example of a display screen.

DETAILED DESCRIPTION

Figure 1:
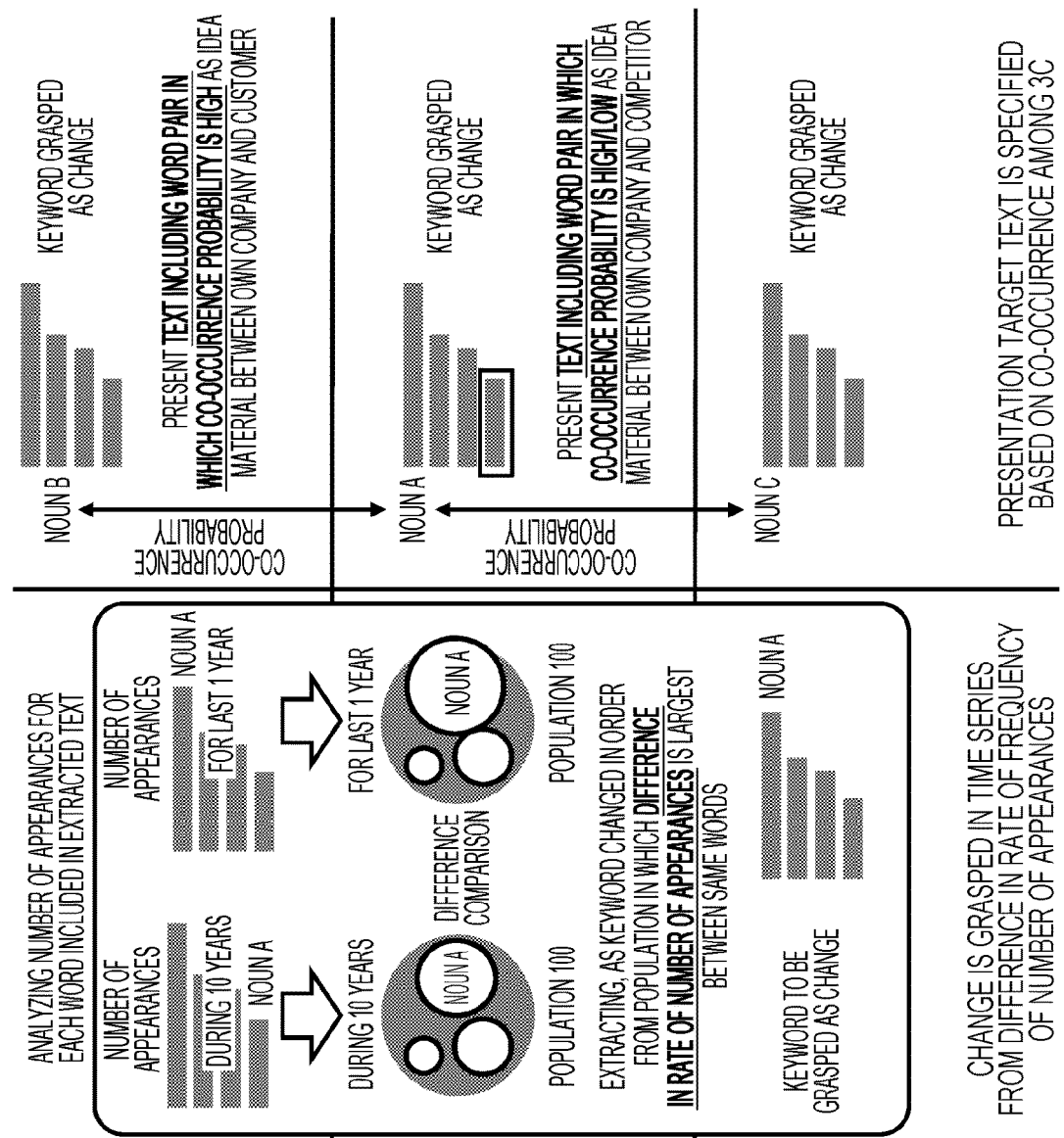
FIG. 1 illustrates an overview of a corporate business support system according to an embodiment.

In the following description, an "interface device" may be one or more interface devices. The one or more interface devices may be at least one of the following:

one or more input/output (I/O) interface devices. An input/output (I/O) interface device is an interface device for at least one of the I/O device and a remote display computer. The I/O interface device for the display computer may be a communication interface device. At least one I/O device may be one of a user interface device, for example, an input device such as a keyboard and a pointing device, and an output device such as a display device:

one or more communication interface devices. The one or more communication interface devices may be the same type of one or more communication interface devices (for example, one or more network interface cards (NIC)) or different types of two or more communication interface devices (for example, an NIC and a host bus adapter (HBA)).

In the following description, a "memory" is one or more memory devices that are examples of one or more storage devices and may typically be a main storage device. At least one memory device in the memory may be a volatile memory device or a nonvolatile memory device.

In the following description, a "permanent storage device" may be one or more permanent storage devices that are examples of one or more storage devices. Typically, the persistent storage device may be a nonvolatile storage device (for example, an auxiliary storage device) and may be specifically, for example, a hard disk drive (HDD), a solid state drive (SSD), a nonvolatile memory express (NVME) drive, or a storage class memory (SCM).

In the following description, a "storage device" may be at least a memory of a memory and a permanent storage device.

In the following description, a "processor" may be one or more processor devices. At least one processor device may typically be a microprocessor device such as a central processing unit (CPU) and may be another type of processor device such as a graphics processing unit (GPU). At least one processor device may have a single core or a multi-core. At least one processor device may be a processor core. At least one processor device may be a processor device in a broad sense, such as a circuit (for example, a field-programmable gate array (FPGA), a complex programmable logic device (CPLD), or an application specific integrated circuit (ASIC)) that is an aggregate of gate arrays in a hardware description language that performs some or all of processes.

In the following description, a function may be described using an expression "yyy unit", but the function may be realized by executing one or more computer programs by a processor, may be realized by one or more hardware circuits (for example, an FPGA or an ASIC), or may be implemented by a combination of hardware circuits. When the function is implemented by a processor executing a program, the determined process is appropriately performed while using the storage device and/or the interface device. Therefore, the function may be at least a part of the processor. The process described with the function as a subject may be a process performed by a processor or a device including a processor. The program may be installed from a program source. The program source may be, for example, a program distribution computer or a computer-readable recording medium (for example, a non-transitory recording medium). The description of each function is exemplary, and a plurality of functions may be integrated into one function or one function may be divided into a plurality of functions.

In the following description, a process is described using a "program" as a subject in some cases, but the process described using the program as a subject may be a process performed by a processor or a device including the processor. Two or more programs may be implemented as one program, or one program may be implemented as two or more programs.

In the following description, information from which an output is obtained with respect to an input may be described with an expression such as "xxx table", but the information may be a table that has any structure, or may be a learning model represented by a neural network, a genetic algorithm, or a random forest that generates an output with respect to an input. Therefore, "xxx table" can be referred to as "xxx information." In the following description, a configuration of each table is exemplary, and one table may be divided into two or more tables, or some or all of two or more tables may be one table.

In the following description, "UI" is an abbreviation for a user interface, but is typically a graphical user interface (GUI).

In the following description, a system that supports corporate business is referred to as a "corporate business support system." The corporate business support system may be one or more physical computers, a software-defined system implemented by at least one physical computer executing predetermined software, or a system implemented on a cloud infrastructure (typically, a plurality of types of computing resources, including processors and storage devices). For example, when the computer includes a display device and the computer displays information on an own display device, the computer may be a corporate business support system. For example, when a first computer (for example, a server) transmits output information to a remote second computer (a display computer (for example, a user terminal to be described below)) and the display computer displays the information (when the first computer displays the information on the second computer), at least the first computer between the first and second computers may be a corporate business support system. That is, when the corporate business support system "displays output information," this may mean that the output information is displayed on a display device of a computer, or that the computer transmits the output information to the display computer (in the latter case, the output information is displayed by the display computer).

Hereinafter, embodiments will be described in detail.

The following description of the embodiment will be made by exemplifying a case where a user of a corporate business support system newly develops an application, an application range, and the like of a known product or service by using the corporate business support system when corporate business is performed with a known customer using the known product or service of the company as commercial materials.

The corporate business support system of the embodiment can similarly have the effects when a user of the system performs corporate business with his/her new product or service of the company as commercial materials or performs a corporate business with respect to a new customer.

FIG. 1 illustrates an overview of a corporate business support system according to the embodiment.

The corporate business support system 100 is a system that supports corporate business based on viewpoints of 3C (customer, company and competitor). The corporate business support system 100 first forms a population for each type of customer, company, and competitor, which are elements of 3C. Accordingly, a population that is a set of text generated or updated within a predetermined period and words such as nouns extracted from the text are formed.

The "customer" is a company or the like that is a business partner of corporate business performed by a user of the corporate business support system 100. The "company" is a company or the like in a workplace of a user of the corporate business support system 100. Further, the "competitor" is a company or the like that has a competitive relationship with the company in a market to which the company belongs, that is, a so-called another company in the same business as that of the company.

That is, a "customer" indicates a company or the like that is a customer of the company. The "customer" may include a so-called potential customer that may become a customer of the company in the future, in addition to the known customer of the company.

The population is formed in the following way. When an operation of designating any search phrase and a target period is accepted from the user of the corporate business support system 100, the corporate business support system 100 first sets the search phrase and the target period as crawlers and performs crawling on the Internet and/or on an intra-network of the company. Accordingly, the text generated or updated, or the like within the target period is collected, including the search phrase. Subsequently, the corporate business support system 100 extracts words such as nouns from the text through natural language processing. Thereafter, the corporate business support system 100 writes data indicating the collected text (hereinafter referred to as "text data") and data indicating the extracted words (hereinafter referred to as "word data") in a database in a storage device of the corporate business support system 100. Accordingly, a population that is a set of text and words is formed.

As described above, the corporate business support system 100 sets a search phrase of which a designation is received from the user as a crawler, performs crawling, and extracts text including the search phrase from an infinite number of pieces of texts on the Internet and/or on an intra-network of the company. For example, forming a population is formed for the company, as illustrated in FIG. 1, in addition to the name or abbreviation of the own company, a term related to a technology or a function of a product or service of the company, a term related to a problem to be solved by the product or the service of the company, and the like are used as a search phrase. When a population is formed for competitor, as illustrated in FIG. 1, in addition to the name or the abbreviation of a company or the like that competes with the company, a term related to a technology or a function included in a product or a service of such a company or the like is used as a search phrase. In this way, the text extracted by the corporate business support system 100 includes a predetermined search phrase related to at least one of the customer, the company, and the competitor that are the elements of the 3C. When a population is formed for the customer, as illustrated in FIG. 1, in addition to the name or the abbreviation of a company or the like that is a customer of the company, a keyword indicating directionality when a product or a service of the company is proposed to the customer is used as a search phrase. The keyword that is used as a search phrase when a population is formed for a customer and indicates directionality when the product or the service of the company is proposed to the customer is referred to as a directional keyword. In the case of the example given in FIG. 1, directional keywords such as "environment," "power consumption," and "energy saving" are used as search phrases when forming a population for customers.

The corporate business support system 100 forming the population for each type of the 3C in the foregoing way subsequently calculates a rate of the number of appearances for each word included in each population. The rate of the number of appearances for each word is referred to as an appearance ratio. The corporate business support system 100 calculates the appearance ratio by obtaining a rate of a total number of each word to a total number of all words included in each population. The corporate business support system 100 can also calculate the appearance ratio by obtaining the rate of the text in which each word appears among the texts generated or updated within a crawling target period included in each population. In the case of the example given in FIG. 1, the target period of the crawling performed when the corporate business support system 100 forms a population in the last 10 years. Subsequently, when an operation of designating the latest period relatively shorter than the crawling target period is received from the user, the corporate business support system 100 calculates a rate of the number of appearances for each word in the designated latest period in accordance with a method similar to the foregoing method. In the case of the example given in FIG. 1, the latest period in which the corporate business support system 100 has received the designation is the latest one year. Then, the corporate business support system 100 compares the appearance ratio within the crawling target period with the appearance ratio in the designated immediately previous period with regard to the same word, and extracts, in order from a word with a largest difference, the word as a keyword in which there is a change in importance and a position setting over time (the details will be described below with reference to FIGS. 4 and 7). The keyword extracted by the corporate business support system 100 is referred to as a change keyword. In the case of the example given in FIG. 1, the corporate business support system 100 extracts a noun A as a change keyword. When the corporate business support system 100 extracts the change keyword, it is possible to ascertain a time-series change in the importance of the change keyword, positioning of the change keyword, and acceptance range of the change keyword in a society.

The above-described appearance ratio of each word indicates a level of the degree of notice of an event represented by the word in the crawling target period or the designated immediately previous period. That is, the word extracted as the change keyword is highly likely to be a word indicating an event that has recently attracted particular interest in particular. Such an event is expected to be related to a prospective opportunity area of in corporate business. Therefore, when the corporate business support system 100 can find a prospective opportunity area in the corporate business by extracting the change keyword.

The corporate business support system 100 extracting the change keyword for each type of the 3C in the foregoing way subsequently specifies representation target text to the user based on a co-occurrence among the 3C of each change keyword. An overview of a process executed by the corporate business support system 100 at this time is as follows. The corporate business support system 100 first extracts a change keyword included in both populations as a co-occurrence word among the extracted change keywords, for each of a combination of the company and the customer and a combination of the company and the competitor which are the elements of the 3C. When the change keyword extracted as the co-occurrence word is included in both the text included in the population for the company and the text included in the population for the customer, the change keyword is highly likely to be a word indicating an event with a high attention degree in recent years in both the company and the customer. Therefore, when such a change keyword is used in the corporate business, it is highly likely that such a change keyword has high appeal to the customer. Accordingly, when such a change keyword can be extracted, a success probability of corporate business can be expected to increase. When the change keyword extracted as the co-occurrence word is included in both the text included in the population for the company and the text included in the population for the competitor, the change keyword is highly likely to be a word indicating an event with a high degree of notice in recent years in the entire industry to which both the company and the competitor belong. Therefore, when such a change keyword can be extracted, a timely proposal can be made in the corporate business. As a result, the success probability of corporate business can be expected to increase. Then, the corporate business support system 100 calculates a co-occurrence probability for each extracted co-occurrence word related to the combination of the company and the customer and each co-occurrence word related to the combination of the company and the competitor. The co-occurrence probability is a rate of the number of pieces of texts including a co-occurrence word pair to the entire texts including the extracted co-occurrence word. Then, for a co-occurrence word related to the combination of the company and the customer, the corporate business support system 100 specifies the text including the co-occurrence word with a high co-occurrence probability and presents the text as an examination material for the user to newly develop an application, an application range, and the like of the product or the service of the company which are commercial materials of corporate business. The corporate business support system 100 specifies text including a co-occurrence word with a high co-occurrence probability and text including a co-occurrence word with a low co-occurrence probability for a co-occurrence word related to the combination of the company and the competitor, and presents the text as an examination material for the user to newly develop an application, an application range, and the like of the product or the service of the company. The text which is presented to the user is referred to as presentation target text.

That is, the corporate business support system 100 outputs the presentation target text specified through the above-described process in association with any one of the combination of the company and the customer and the combination of the company and the competitor. As a result, the user of the corporate business support system 100 can ascertain description content of the text including the extracted co-occurrence word, positioning of the text, and the like, and can use the description content for the corporate business.

In this way, the corporate business support system 100 according to the embodiment can appropriately support the corporate business by presenting the presentation target text specified in the above-described way to the user.

Figure 2:
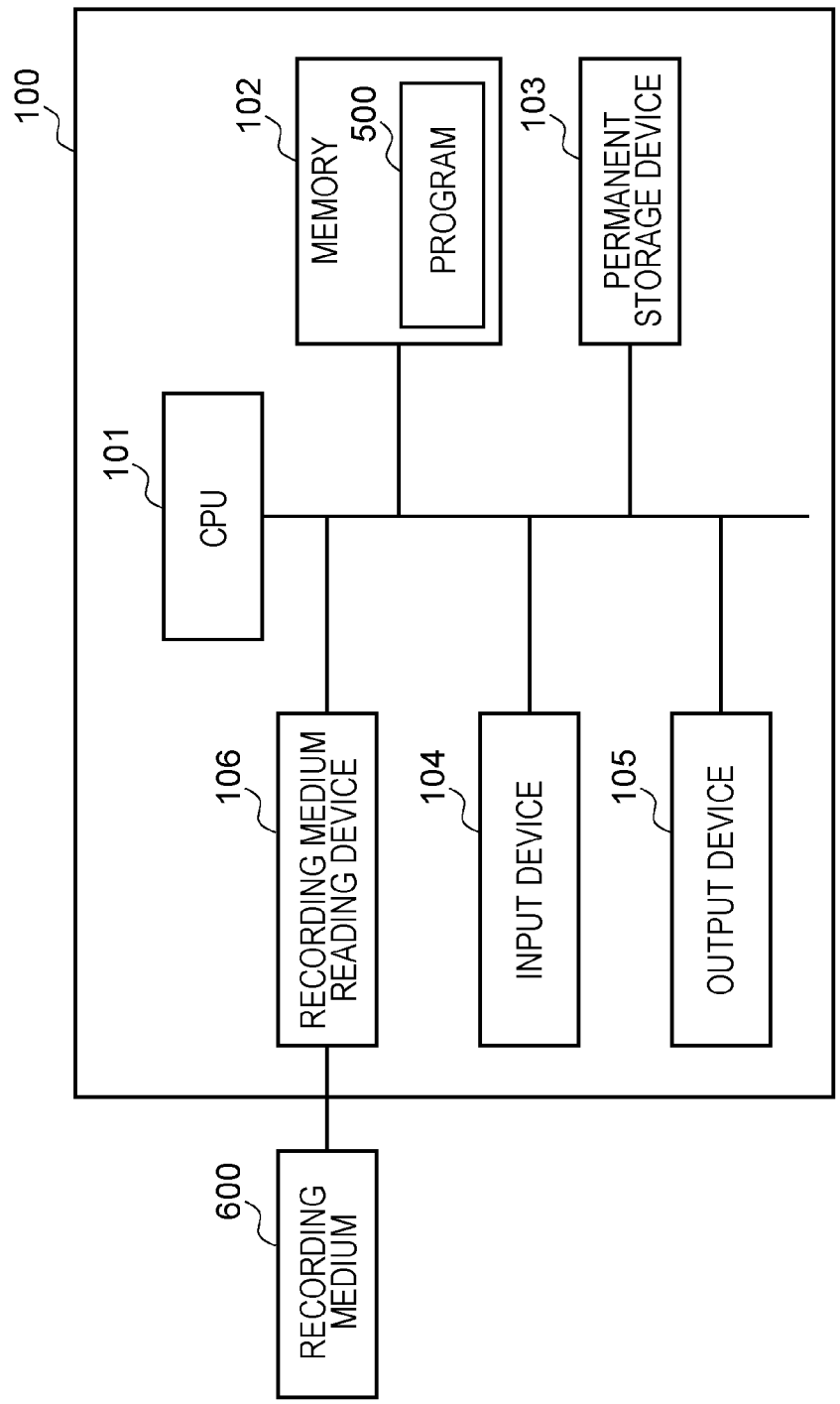
FIG. 2 illustrates a hardware configuration example of the corporate business support system according to the embodiment.

FIG. 2 illustrates a hardware configuration example of the corporate business support system 100 according to the embodiment.

Each constituent of the corporate business support system 100 illustrated in FIG. 2 is implemented by hardware including a processor device (hereinafter also simply referred to as a "processor") such as a central processing unit (CPU) 101 and various co-processors, a storage device such as the memory 102 and the permanent storage device 103, and a wired or wireless communication line connecting them and an interface device such as the input device 104 and the output device 105, and software which is stored in the storage device and supplies a processing instruction to the processor.

The storage device stores at least a corporate business support program. The corporate business support program is a computer program 500 supporting corporate business. When the corporate business support program is executed by the processor, a process such as a population forming process, a change keyword extraction process, a co-occurrence word extraction process, and a proposal timing specifying process is performed. The details of these processes will be described below.

The corporate business support program may be configured by a device driver, an operating system, various application programs located in upper layers, and a library that provides common functions to these programs.

Each block to be described below indicates a block in units of functions instead of a configuration in units of hardware.

Figure 3:
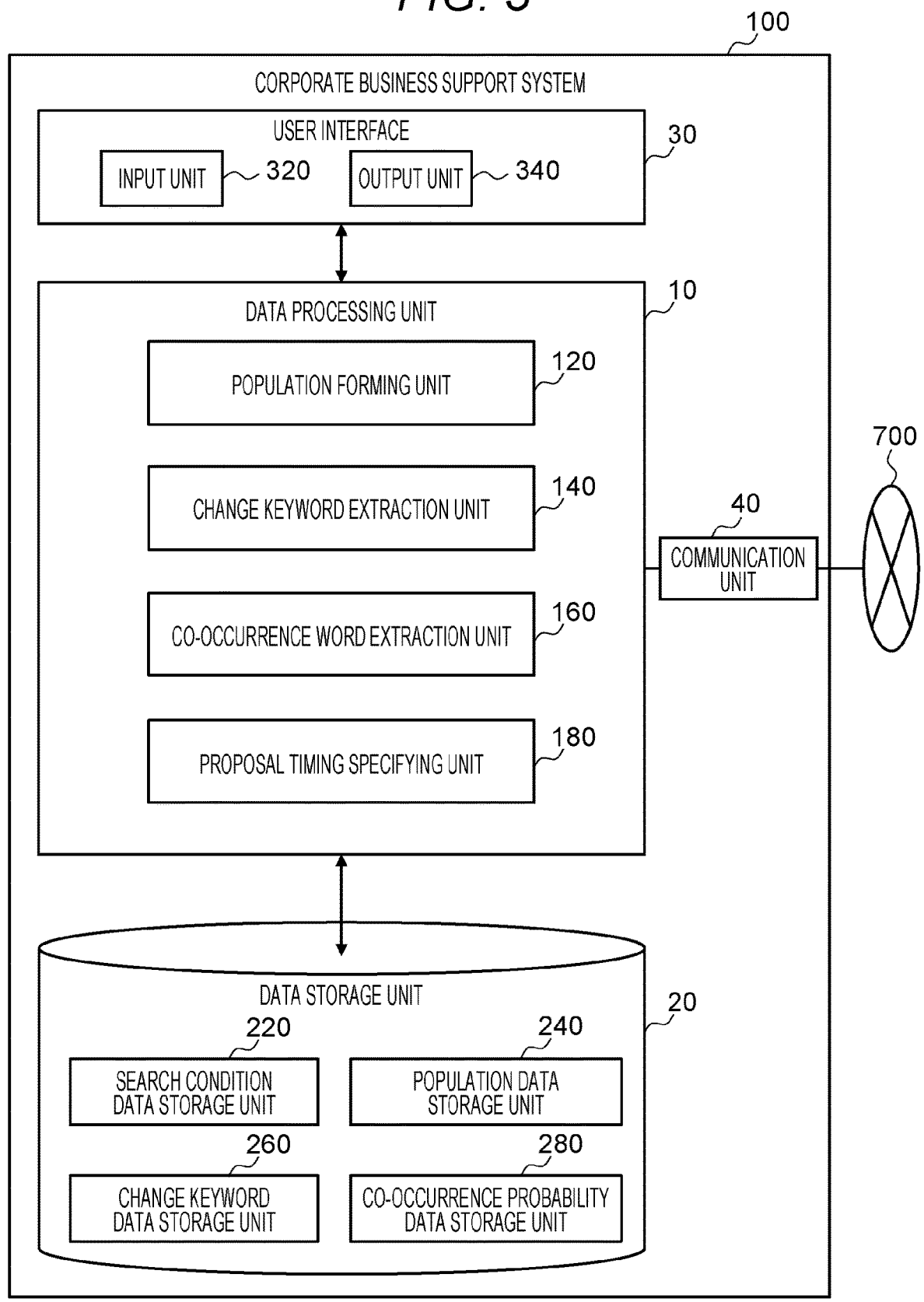
FIG. 3 illustrates a configuration example of a functional block of a corporate business support system according to an embodiment.

FIG. 3 illustrates a configuration example of a functional block of the corporate business support system 100 according to the embodiment.

The corporate business support system 100 includes functional blocks of a data processing unit 10, a data storage unit 20, a user interface unit 30, and a communication unit 40.

The data processing unit 10 executes various types of data processing based on a user operation input detected by the user interface unit 30, data acquired by the communication unit 40, and a program and data stored in the data storage unit 20. The data processing unit 10 also functions as an interface for the user interface unit 30, the communication unit 40, and the data storage unit 20.

The data processing unit 10 includes functional blocks of a population forming unit 120, a change keyword extraction unit 140, a co-occurrence word extraction unit 160, and a proposal timing specifying unit 180. The population forming unit 120 executes various processes of forming a population. The change keyword extraction unit 140 executes various processes of extracting a change keyword. The co-occurrence word extraction unit 160 executes various processes of extracting a co-occurrence word. The proposal timing specifying unit 180 executes various processes of specifying a proposal timing.

The population forming unit 120 forms a population for each type of element of the 3C (customer, company and competitor) and for each predetermined period. This process executed by the population forming unit 120 is referred to as a population forming process. As a result, a population that is a set of text and words is formed. The details of the population forming process will be described below with reference to FIG. 4.

The change keyword extraction unit 140 extracts a change keyword based on the population formed by the population forming unit 120. This process executed by the change keyword extraction unit 140 is referred to as a change keyword extraction process. The details of the change keyword extraction process will be described below with reference to FIGS. 4 and 7.

The co-occurrence word extraction unit 160 extracts, as co-occurrence words, change keywords included in both populations among the change keywords extracted by the change keyword extraction unit 140 in each of a combination of a company and a customer and a combination of a company and a competitor which are the elements of the 3C. The co-occurrence word extraction unit 160 calculates a co-occurrence probability of each extracted co-occurrence word. These processes executed by the co-occurrence word extraction unit 160 are collectively referred to as a co-occurrence word extraction process. The details of the co-occurrence word extraction process will be described below with reference to FIGS. 4 and 10.

The proposal timing specifying unit 180 specifies a preferable proposal timing when the user makes a new proposal based on the presentation target text. This process executed by the proposal timing specifying unit 180 is referred to as a proposal timing specifying process. The details of the proposal timing specifying process will be described below with reference to FIGS. 7 and 9.

The data processing unit 10 can implement these functional blocks by executing a predetermined program.

The data storage unit 20 is configured using, for example, a storage device such as a RAM or a flash memory, and stores a program supplying various processing commands to the data processing unit 10 and data indicating various types of information used in processes executed by the data processing unit 10 in the storage device. For example, the search condition data stored in the search condition data storage unit 220, the population data stored in the population data storage unit 240, the change keyword data stored in the change keyword data storage unit 260, and the like are stored in a storage device by the data storage unit 20. The data processing unit 10 can implement the functional blocks of the population forming unit 120, the change keyword extraction unit 140, the co-occurrence word extraction unit 160, and the proposal timing specifying unit 180 by reading and writing these pieces of information in the data storage unit 20.

The data storage unit 20 includes functional blocks of a search condition data storage unit 220, a population data storage unit 240, a change keyword data storage unit 260, and a co-occurrence probability data storage unit 280.

The search condition data storage unit 220 mainly stores search condition data indicated by the search condition table exemplified in FIGS. 5A to 5C. The search condition table is a table for managing search condition data. The details of the search condition data and the search condition table will be described below with reference to FIGS. 5A to 5C.

The population data storage unit 240 mainly stores population data shown in the population table exemplified in FIG. 6. The population table is a table for managing population data. The details of the population data and the population table will be described below with reference to FIG. 6.

The change keyword data storage unit 260 mainly stores change keyword data shown by the change keyword table exemplified in FIGS. 8A and 8B. The change keyword table is a table for managing the change keyword data. The details of the change keyword data and the change keyword table are described below with reference to FIGS. 8A and 8B.

The co-occurrence probability data storage unit 280 mainly stores co-occurrence probability data shown by the co-occurrence probability table exemplified in FIG. 11. The co-occurrence probability table is a table for managing co-occurrence probability data. The details of the co-occurrence probability data and the co-occurrence probability table will be described below with reference to FIG. 11.

The user interface unit 30 receives an input operation from the user and is in charge of a process related to the user interface such as image display and a voice output. The user interface unit 30 includes functional blocks of an input unit 320 and an output unit 340. The input unit 320 detects various operations from the user. The input unit 320 is configured using, for example, a keyboard, a pointing device, a touch panel, or the like. The output unit 340 displays text including the extracted co-occurrence word or the like on the output device 105 and executes display of various screens, voice outputs, and the like on the output device 105. The output device 105 is configured using, for example, a liquid crystal display, a touch screen, or the like.

The communication unit 40 is in charge of a communication process which is performed via the Internet 700 (an example of a communication network) with a user terminal owned by each user of the corporate business support system 100 and other devices such as various server devices. The communication unit 40 is configured using, for example, a network interface card (NIC), a host bus adapter (HBA), or the like.

In the embodiment, as described above, each function of the corporate business support system 100 is integrally implemented by one computer device. However, each of these functions may be implemented by a plurality of computer devices or server devices connected to each other. The corporate business support system 100 may have a configuration including a general-purpose computer device such as a laptop PC and a web browser installed therein, or may have a configuration including a web server and various portable devices.

A correspondent relation between the constituent elements illustrated in FIG. 2 and the constituent elements illustrated in FIG. 3 is, for example, as follows.

That is, the data processing unit 10 illustrated in FIG. 3 executes various types of data processing by a processor device such as the CPU illustrated in FIG. 2. The data storage unit 20 illustrated in FIG. 3 stores various types of data in a storage device such as the memory 102 or the storage 103 illustrated in FIG. 2. Further, the input unit 320 illustrated in FIG. 3 performs the function by the input device 104 illustrated in FIG. 2, and the output unit 340 illustrated in FIG. 3 performs the function by the output device 105 illustrated in FIG. 2.

Next, a flow of each process executed by the corporate business support system 100 will be described.

FIG. 4 is a flowchart illustrating an example of a flow of the entire processing performed in the embodiment.

In step S410, the data processing unit 10 executes a population forming process by the population forming unit 120. The population forming process is executed in the following procedure. The population forming unit 120 first performs crawling under the search conditions in which the input operation has been received from the user via the input unit 320. The population forming unit 120 writes the input search condition in the search condition table stored in the search condition data storage unit 220. A configuration example of the search condition table is illustrated in FIGS. 5A to 5C. A search condition table 500A illustrated in FIG. 5A shows search conditions for forming a population for the customer, a search condition table 500B illustrated in FIG. 5B shows search conditions for forming a population for the company, and a search condition table 500C illustrated in FIG. 5C shows search conditions for forming a population for the competitor. The record includes, as items, a proposal No. for identifying at least the corporate business for each case or each business, a name or an abbreviation of the customer, the company, or the competitor, a search phrase set for a crawler, a target period of crawling, and a date and time of execution of crawling. When the population is formed for the customer, as illustrated in FIG. 5A, the directional keyword is recorded as the search phrase in the search condition table 500A. The record may include, for example, a type of network for determining a crawling implementation range, a type of online service, SNS, or the like, a type (extension) of a file on the network, and the like.

That is, the search condition table 500 indicates the crawling execution condition by recording the crawling execution date and time and the search condition in association with each other for each record. According to the example illustrated in FIG. 5A, in the search condition table 500A, it is recorded that crawling for corporate business of proposal No. "1" to "company A" that is a customer is performed with a period of "10 years" and three keywords of "environment," "power consumption," and "energy saving" as directional keywords at "15:30:00 on May 25, 2022."

Next, the population forming unit 120 forms a population for each of the customer, the company, or the competitor based on a result of the crawling in the above-described way. The population is a set of text including one or more search phrases generated, updated, or the like within a target period of crawling, and words such as nouns extracted from the text by natural language processing. Data indicating a formed population (hereinafter, referred to as "population data") is written by the population forming unit 120 in the population table stored by the population data storage unit 240. A configuration example of the population table is illustrated in FIG. 6. The record includes, as items, a proposal No. for identifying at least corporate business for each case or each business, a search formula expressing a search condition at the time of crawling, text collected through crawling, a URL of a website on which the text is posted, a word such as a noun extracted from the text, and a generation date or an update date of the text. When the formed population relates to a customer, the record may include, for example, a directional keyword. That is, the population table 600 shows the result of the population forming process by recording content of the population formed by the population forming process for each record in association with the search condition in the population forming process. According to the example illustrated in FIG. 6, the population table 600 records that, for corporate business of proposal No. "1" to "company A" that is a customer, as a result of performing crawling by using a name or an abbreviation of "company A" and three directional keywords of "environment," "power consumption," and "energy saving" as search phrases, text generated or updated on "11 Oct. 2020" is collected, "noun A" and "noun B" are extracted from the text, and the text includes the directional keyword of "environment" together with a URL of a website that is a posting source of the text.

The population forming unit 120 simultaneously executes various processes in the population forming process for each of the customer, the company, and the competitor. Therefore, the search condition table 500 and the population table 600 have a record for each proposal No. Accordingly, it is possible to align the time series for all the customer, the company, and the competitor. As a result, the change keyword extraction process and the co-occurrence word extraction process to be described below can be strictly executed.

As a result of the population forming process, a population is formed for each type of element of the 3C. Accordingly, the change keyword extraction process performed by the change keyword extraction unit 140 and the co-occurrence word extraction process performed by the co-occurrence word extraction unit 160 can be executed. When the population forming process is completed, the data processing unit 10 moves to step S420.

In step S420, the change keyword extraction unit 140 of the data processing unit 10 executes a change keyword extraction process. As a result of the change keyword extraction process, the change keyword is extracted for each type of the 3C. Accordingly, the co-occurrence word extraction process performed by the co-occurrence word extraction unit 160 can be executed. The details of the change keyword extraction process performed in step S420 will be described below with reference to the flowchart in FIG. 7. When the change keyword extraction process is completed, the data processing unit 10 moves to step S430.

In step S430, the co-occurrence word extraction unit 160 of the data processing unit 10 executes the co-occurrence word extraction process. Accordingly, for each of the combination of the company and the customer and the combination of the company and the competitor which are elements of the 3C, the change keywords included in both populations are extracted as co-occurrence words. Accordingly, the co-occurrence probability is calculated for each extracted co-occurrence word. As a result, representation target text for the user is specified. The details of the co-occurrence word extraction process performed in step S430 will be described below with reference to the flowchart in FIG. 10. When the co-occurrence word extraction process is completed, the data processing unit 10 moves to step S440.

In step S440, in cooperation with the data processing unit 10, the output unit 340 outputs the presentation target text identified through the population forming process, the change keyword extraction process, and the co-occurrence word extraction process described above, that is, the text including the extracted co-occurrence word, in association with any one of the combination of the company and the customer and the combination of the company and the competitor.

When the extracted co-occurrence word among these relates to a co-occurrence between the text included in the population for the company and the text included in the population for the customer, the data processing unit 10 specifies text including a co-occurrence word pair having a co-occurrence probability of a predetermined threshold or more as the presentation target text. Then, output unit 340 outputs the presentation target text to output device 105 in a way of the display screen exemplified in FIG. 12 (step S440A).

On the other hand, when the extracted co-occurrence word relates to a co-occurrence between the text included in the population for the company and the text included in the population for the competitor, the data processing unit 10 specifies text including a co-occurrence word pair having a co-occurrence probability of a predetermined first threshold or more and text including a co-occurrence word pair having a co-occurrence probability of a predetermined second threshold or less as the presentation target text. Then, output unit 340 outputs the presentation target text to output device 105 in the same way described in step S440A (step S440B).

When the process in step S440 (S440A and S440B) is completed, the data processing unit 10 ends the process illustrated in the flowchart of FIG. 4.

As described above, the corporate business support system 100 according to the embodiment executes each process of steps S410 to S440 of FIG. 4, specifies the presentation target text, and causes the output device 105 to output the text. Among them, the process of specifying the presentation target text from all the texts included in the population formed by the population forming process can be roughly divided into the change keyword extraction process executed by the change keyword extraction unit 140 in step S420 and the co-occurrence word extraction process executed by the co-occurrence word extraction unit 160 in step S430. Accordingly, first, the details of the change keyword extraction process performed in step S420 will be described with reference to the flowchart of FIG. 7. The details of the co-occurrence word extraction process performed in step S430 will be described below with reference to the flowchart in FIG. 10.

FIG. 7 illustrates an example of a flow of the change keyword extraction process.

In step S701, the data processing unit 10 sets, as the designated latest period, any latest period relatively shorter than the crawling target period in which the change keyword extraction unit 140 receives the input operation from the user via the input unit 320. That is, the designated latest period is relatively shorter than the crawling target period. On the other hand, the crawling target period is relatively longer than the designated latest period set in step S701. When the process in step S701 is completed, the data processing unit 10 moves to step S702.

In step S702, the change keyword extraction unit 140 of the data processing unit 10 counts the number of appearances for each word included in the population with reference to the population table 600 stored by the population data storage unit 240. This process is executed for both a relatively long crawling target period (hereinafter also referred to as a "first predetermined period") and a relatively short designated latest period (hereinafter also referred to as a "second predetermined period"). This process is executed for each type of element of the 3C. Further, whether each word in the population is included in the designated latest period is determined based on a date on which the text of the extraction source of the word is generated or updated. The number of appearances for each word counted in step S702 is recorded in the change keyword table (to be described below with reference to FIGS. 8A and 8B) stored in the change keyword data storage unit 260. When the process in step S702 is completed, the data processing unit 10 moves to step S703.

In step S703, the data processing unit 10 calculates, for each of the crawling target period and the designated latest period, a population which is a denominator when the change keyword extraction unit 140 calculates the appearance ratio of each word. Of the two types of populations calculated in step S703, a population which is a denominator at the time of calculation of the appearance ratio of each word in the crawling target period is referred to as a first population. On the other hand, the population which is the denominator at the time of calculation of the appearance ratio of each word in the designated latest period is referred to as a second population. This process is performed by adding up the number of appearances for the word that appears once or more within the crawling target period or the designated latest period. This process is executed for each type of element of the 3C. When the process in step S703 is completed, the data processing unit 10 moves to step S704.

In step S704, the change keyword extraction unit 140 of the data processing unit 10 calculates the appearance ratio of each word. This process is performed by calculating a rate of each word extracted from the text generated or updated during the crawling target period to the first population and a rate of each word extracted from the text generated or updated during the designated latest period to the second population. This process is executed for each type of element of the 3C. The appearance ratios of the words during the crawling target period and the designated latest period calculated in step S704 are recorded in the change keyword table (to be described below with reference to FIGS. 8A and 8B) stored in the change keyword data storage unit 260. When the process in step S704 is completed, the data processing unit 10 moves to step S705.

In step S705, the change keyword extraction unit 140 of the data processing unit 10 extracts the change keyword. This process is performed by obtaining, for the same words, a difference between an appearance ratio of each word extracted from the text generated or updated during the crawling target period and an appearance ratio of each word extracted from the text generated or updated during the designated latest period, arranging the words in order from the word having the largest difference, and ranking the words. At this time, the change keyword extraction unit 140 extracts words until a predetermined rank as change keywords. The change keyword extraction unit 140 may extract a word having a difference between two appearance ratios equal to or larger than a predetermined threshold as a change keyword. This process in step S705 is executed for each type of element of the 3C. The data (hereinafter referred to as "change keyword data") indicating the extracted change keyword is written by the change keyword extraction unit 140 into the change keyword table stored in the change keyword data storage unit 260. A configuration example of the change keyword table is illustrated in FIGS. 8A and 8B. Of these tables, the change keyword table 800A illustrated in FIG. 8A is a table for managing information regarding a population related to an extracted change keyword by recording a proposal No. for identifying corporate business for each case or each business, a name or abbreviation of a customer, a company, or a competitor related to the population used for extracting the change keyword, and a crawling target period and a designated latest period used for extracting the change keyword in association with each other for each record. Further, the record of the change keyword table 800B illustrated in FIG. 8B includes, as items, at least each word, the number of appearances of the word in the text generated or updated within the crawling target period, the number of appearances of the word in the text generated or updated within the designated latest period, the appearance ratios of the word during the crawling target period and the designated latest period, and the difference between the two appearance ratios for the word. That is, the change keyword table 800B shows a result of the change keyword extraction process by recording the word extracted as the change keyword and the number of appearances, the appearance ratio, and a difference between the appearance ratios of the word in association with each other for each record. According to the example illustrated in FIG. 8A, it is recorded that the change keyword extraction process is executed for "company A" which is the customer, using the crawling target period as the last 10 years and the designated latest period as the last 1 year. According to the example illustrated in FIG. 8B, for the "noun A" extracted as the change keyword, the fact that the number of appearances during the crawling target period is "75 times" and the appearance ratio is "period 1.9%," the fact that the number of appearances during the designated latest period is "74 times" and the appearance ratio is "12.1%," and the fact that the difference between the two appearance ratios is the largest among all the change keywords extracted with "+10.2" are recorded in the change keyword table 800B along with the proposal No. "1-1" related to the extraction of the change keyword. When the process in step S705 is completed, the data processing unit 10 moves to step S706.

Figure 9:
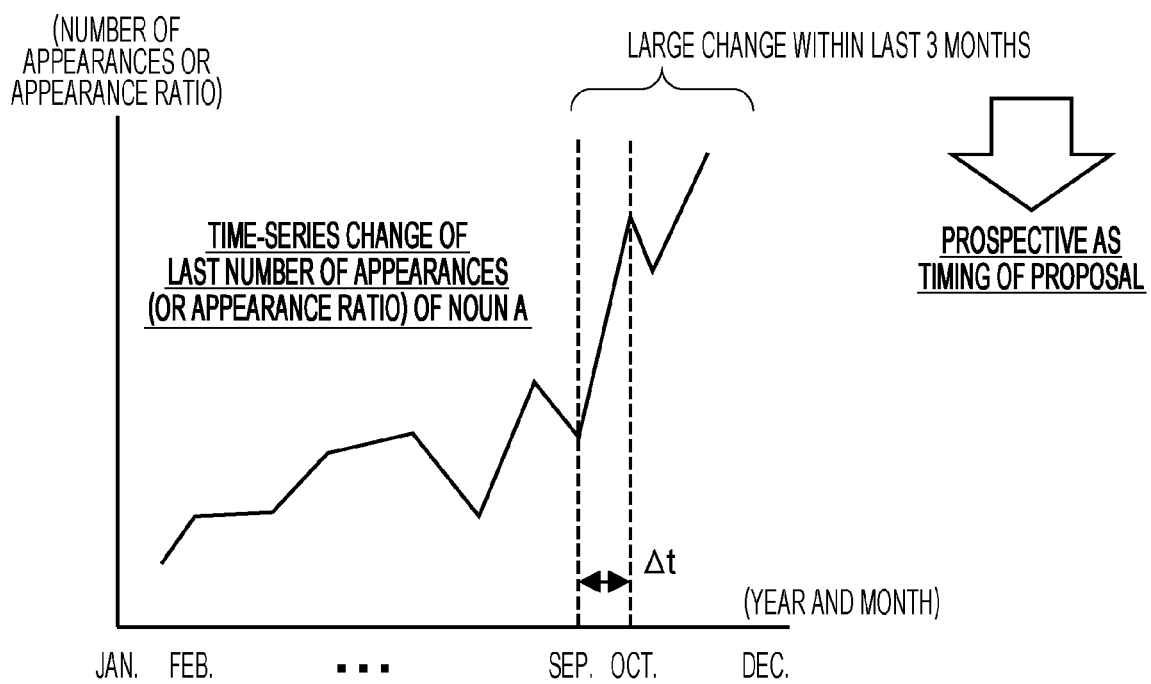
FIG. 9 illustrates an overview of a method of specifying a proposal timing.

In step S706, the proposal timing specifying unit 180 of the data processing unit 10 executes the proposal timing specifying process. As described above, the proposal timing specifying process is a process of specifying a preferable proposal timing when the user makes a new proposal based on the presentation target text. The proposal timing specifying unit 180 executes this process based on a time-series change of the appearance ratio of the change keyword in each of the populations measured by the change keyword extraction unit 140. A way in which the proposal timing specifying unit 180 specifies the proposal timing is illustrated in FIG. 9. As illustrated in FIG. 9, the change keyword extraction unit 140 measures the time series change of the number of appearances or the appearance ratio of the change keyword by reading the number of appearances or the appearance ratio of the word extracted as the change keyword during the designated latest period from the change keyword table 800B illustrated in FIG. 8B and tracing the number of appearances or the appearance ratio of the change keyword in the time series at predetermined time intervals. The proposal timing specifying unit 180 specifies the proposal timing based on magnitude of the time-series change of the number of appearances or the appearance ratio of the change keyword for each predetermined time related to the interval. In the corporate business support system 100 according to the embodiment, the proposal timing specifying unit 180 specifies the proposal timing when the magnitude of the time-series change is equal to or greater than a predetermined threshold value. When the process in step S706 is completed, the data processing unit 10 ends the change keyword extraction process illustrated in the flowchart of FIG. 7.

FIG. 10 illustrates an example of a flow of the co-occurrence word extraction process.

In step S1001, the co-occurrence word extraction unit 160 of the data processing unit 10 extracts a co-occurrence word in the above-described way for each of the combination of the company and the customer and the combination of the company and the competitor which are elements of the 3C. As described above, the co-occurrence word is a change keyword included in both the population formed for the company and the population formed for the customer or the competitor among the change keywords extracted for each of the company, the customer, and the competitor through the change keyword extraction process. The co-occurrence word extracted in step S1001 is recorded in a co-occurrence probability table (to be described below with reference to FIG. 11) stored in the co-occurrence probability data storage unit 280. When the process in step S1001 is completed, the data processing unit 10 moves to step S1002.

In step S1002, the co-occurrence word extraction unit 160 of the data processing unit 10 calculates the co-occurrence probability in the above-described way. The data indicating the co-occurrence probability calculated in step S1002 (hereinafter referred to as "co-occurrence probability data") is recorded in the co-occurrence probability table stored in the co-occurrence probability data storage unit 280 by the co-occurrence word extraction unit 160. A configuration example of the co-occurrence probability table is illustrated in FIG. 11. The record includes, as items, a proposal No. for identifying at least corporate business for each case or each sales, a co-occurrence word extracted in step S1001, a directional keyword or a search phrase used at the time of forming of a population of each of the company, the customer, and the competitor, a co-occurrence probability between the co-occurrence words extracted in step S1001, and a URL of a website of a posting source of text including two co-occurrence words that are calculation targets of the co-occurrence probability at the same time. The co-occurrence word is recorded together along with information indicating the order of the number of appearances in each population for each type of element of the company, the customer, and the competitor. The co-occurrence probability between the co-occurrence words is calculated for a combination of each co-occurrence word included in the population formed for the company and each co-occurrence word included in the population formed for the customer or the competitor (hereinafter referred to as a "co-occurrence word pair"). As illustrated in FIG. 11, for each co-occurrence word included in the population related to the company, each co-occurrence word pair related to the calculation of the co-occurrence probability is formed in a round-robin manner in the order of the number of appearances in the population between co-occurrence words included in the population related to the customer or between co-occurrence words included in the population related to the competitor. In other words, the co-occurrence word extraction unit 160 calculates the co-occurrence probability for the combination of the change keywords included in each of the populations formed for the customer, the company, or the competitor. The co-occurrence word extraction unit 160 calculates the co-occurrence probability by obtaining a rate of the number of pieces of texts in which each co-occurrence word pair is simultaneously described to the number of all texts included in two populations related to the co-occurrence word pair in the designated latest period. That is, the co-occurrence probability table 1100 shows a result of the co-occurrence word extraction process that is a base of identifying the proposal target text by recording, for each record, the co-occurrence probability of each co-occurrence word extracted in step S1001 and each co-occurrence word pair calculated in step S1002 in association with the URL of the website of the posting source of the text in which each co-occurrence word pair is simultaneously described, and the directional keyword or the search word used in the population forming process. According to the example illustrated in FIG. 11, in the co-occurrence probability table 1100, the fact that the co-occurrence probability of a co-occurrence word pair of a co-occurrence word "noun A" of which the number of appearances is the largest in the population related to customers and a co-occurrence word of "noun Y" of which the number of appearances is the second largest in the population related to the company is as high as "15.5%" is recorded along with the URL of the website of the posting source of the text in which the co-occurrence word pair is simultaneously described, the directional keyword and the company search phrase used in the population forming process, and the proposal No. Similarly, according to the example illustrated in FIG. 11, in the co-occurrence probability table 1100, the co-occurrence probability of a co-occurrence word pair of a co-occurrence word "noun M" of which the number of appearances is the largest in the population related to the competitor and a co-occurrence word of "noun Y" of which the number of appearances is the second largest in the population related to the company is as low as "0.3%," and the co-occurrence probability of a co-occurrence word pair of a co-occurrence word "noun L" of which the number of appearances is the largest in the population related to the competitor and a co-occurrence word "noun X" of which the number of appearances is the largest in the population related to the company is as high as "18.9%" are recorded along with the URL of the website of the posting source of the text in which these co-occurrence word pairs are simultaneously described, the competitor search phrase, the company search phrase, and the proposal No. used in the population forming process. When the process in step S1002 is completed, the data processing unit 10 ends the co-occurrence word extraction process illustrated in the flowchart of FIG. 10.

As described above, in the corporate business support system 100 according to the embodiment, in cooperation with the data processing unit 10, the output unit 340 outputs the presentation target text specified through the population forming process, the change keyword extraction process, and the co-occurrence word extraction process in association with one of the combination of the company and the customer and the combination of the company and the competitor. An example of the display screen 1200 at this time is illustrated in FIG. 12. As illustrated in FIG. 12, when the co-occurrence word pair relates to a co-occurrence between the text included in the population for the company and the text included in the population for the customer, the output device 105 of the output unit 340 displays the text including the co-occurrence word pair having a high co-occurrence probability as the presentation target text. Accordingly, the user of the corporate business support system 100 can make a sales proposal that can strongly appeal to customers in corporate business to customers. On the other hand, when the co-occurrence word pair relates to a co-occurrence between the text included in the population for the company and the text included in the population for the competitor, the output device 105 of the output unit 340 displays, as the presentation target text, the text including the co-occurrence word pair having a high co-occurrence probability and the co-occurrence word pair having a low co-occurrence probability. Accordingly, the user of the corporate business support system 100 can newly make a sales proposal attractive to the customer and find out a potential customer by promptly ascertaining and following the tendency of the competitor in the corporate business to the customer, and ascertaining a change that the competitor is not aware of. At this time, on the display screen 1200, the presentation target text in which the co-occurrence word pair having a high co-occurrence probability is described is displayed in a list form in descending order of the co-occurrence probability, and the presentation target text in which the co-occurrence word pair having a low co-occurrence probability is described is displayed in a list form in ascending order of the co-occurrence probability. Further, at this time, the presentation target text is preferentially displayed on the display screen 1200 in order from text including more directional keywords, company search phrases, and competitor search phrases. The words such as co-occurrence words and search phrases are highlighted and displayed in a form in which different background colors are added for each type.

When supporting target corporate business is for a potential customer for the company, the corporate business support system 100 can execute each process described above without including a name or abbreviation of a customer in the search phrase. At this time, instead of the name or abbreviation of the customer, the corporate business support system 100 may be able to use the name or abbreviation of the company or the like or an industry that has a high interest in a directional keyword such as "environment" or "power consumption" as the search phrase.

Regardless of whether the customer is an existing customer or a potential customer, the corporate business support system 100 can perform each process described above by using a term related to the industry to which the customer belongs as a search term along with the directional keyword or the name or abbreviation of the customer or instead of these search terms. In this case, the population forming unit 120 executes the population forming process with reference to a database related to the industry dictionary in response to a selection operation of the user. Accordingly, in the corporate business to the customer, the user of the corporate business support system 100 can make a sales proposal based on a situation of the industry to which the customer belongs, or make a sales proposal based on an attitude and an effort of the customer with respect to the situation of the industry.

According to the embodiment of the present invention described above, the following operational effects are obtained.

(1) The corporate business support system 100 includes the population forming unit 120, the change keyword extraction unit 140, the co-occurrence word extraction unit 160, and the output unit 340. The population forming unit 120 forms a population for each type of element of the 3C (customer, company and competitor) and for each predetermined period. The change keyword extraction unit 140 extracts a change keyword based on the formed population. The co-occurrence word extraction unit 160 extracts a change keyword included in both populations as a co-occurrence word among the extracted change keywords in a combination of a company and a customer and a combination of the company and a competitor which are elements of the 3C. The output unit 340 outputs text including the extracted co-occurrence word in association with one of the combination of the company and the customer and the combination of the company and the competitor. The population is a set of text and words. In each population, the text includes a predetermined search phrase related to at least one of the customer, the company, and the competitor which are the elements of the 3C. The word is a noun extracted from the text in the population. The change keyword extraction unit 140 calculates, for each of the extracted words, an appearance ratio indicating a ratio of a number of each of the extracted words to a total number of the extracted words, calculates, as a change degree, a rate of an appearance ratio in a second population formed for a second predetermined period that is a relatively short time to an appearance ratio in a first population formed for a first predetermined period that is a relatively long time, and extracts the change keyword from a word in descending order of the change degree as the change keyword that has a large change and is to be noticed in a corporate business proposal. With this configuration, presentation target text that is likely to be useful in corporate business for customers is identified accurately and reliably. As a result, the corporate business support system 100 can appropriately support corporate business.

(2) When there is text including two or more kinds of co-occurrence words, the co-occurrence word extraction unit 160 extracts a combination of two kinds of co-occurrence words as a co-occurrence word pair and calculates, for each of the extracted co-occurrence word pairs, a co-occurrence probability indicating a rate of the number of pieces of texts including the co-occurrence word pair in all texts including the extracted co-occurrence words. With this configuration, the corporate business support system 100 can accurately and reliably specify presentation target text in accordance with a type of target of co-occurrence analysis.

(3) When the extracted co-occurrence word relates to a co-occurrence between text included in the population for the company and text included in the population for the customer, the output unit 340 outputs, in order from text including a co-occurrence word pair having a highest co-occurrence probability, the text as text to be noticed in a corporate business proposal in which interests of the customer and the company coincide. With this configuration, the user of the corporate business support system 100 can make a business proposal that can strongly appeal to the customer in the corporate business to the customer.

(4) When the extracted co-occurrence word relates to a co-occurrence between text included in the population for the company and text included in the population for the competitor, the output unit 340 outputs the extracted co-occurrence word, as text to be noticed in a corporate business which the competitor does not notice, in order from the text including the co-occurrence word pair having the highest co-occurrence probability described above and the co-occurrence word pair having a low co-occurrence probability described above. With this configuration, the user of the corporate business support system 100 can promptly ascertain and follow a tendency of the competitor in the corporate business to the customer and can ascertain a change of which the competitor is not aware, and thus it is possible to newly make a sales proposal attractive to the customer and find out a potential customer.

(5) The text includes a directional keyword that is a predetermined search phrase related to the customer that is an element of the 3C. With this configuration, the user of the corporate business support system 100 can make a sales proposal that can strongly appeal to the customer by providing consistency in the direction of the sales proposal or accurately changing the direction of the sales proposal in accordance with the needs of the customer in the corporate business to the customer.

(6) The output unit 340 preferentially presents the text including the directional keyword. With this configuration, the user of the corporate business support system 100 can easily preferentially use presentation target text in which the directionality of the sales proposal to the customer is matched.

(7) The directional keyword related to the customer includes at least one of a name or an abbreviation of a customer and a term related to an industry to which the customer belongs. With this configuration, in the corporate business to the customer, the user of the corporate business support system 100 can make a sales proposal based on a situation of the industry to which the customer belongs, or make a sales proposal based on an attitude and an effort of the customer with respect to the situation of the industry.

(8) The change keyword extraction unit 140 measures a time-series change of the number of appearances or an appearance ratio of the change keyword in each of the populations. When magnitude of the time-series change of the number of appearances or the appearance ratio of the change keyword is equal to or greater than a predetermined threshold, the output unit 340 reports that it is a preferable business implementation time for the text including the change keyword. With this configuration, the user of the corporate business support system 100 ascertains a preferable timing at which a sales proposal is made in the corporate business to the customer, and thus it is easier to reliably ascertain an opportunity.

It should be noticed that the present invention is not limited to the foregoing embodiment, and can be implemented using any constituent without departing from the gist of the present invention.

The foregoing embodiments and modifications are merely exemplary, and the present invention is not limited to these content as long as the features of the invention are not impaired. Although various embodiments and modifications have been described above, the present invention is not limited to these content. Other aspects which are conceivable within the scope of the technical spirit of the present invention are also included within the scope of the present invention.

What is claimed is:

1. A corporate business support system comprising:
a processor configured to form a population for each type of element of 3C (customer, company and competitor) and for each predetermined period;
the processor configured to extract a change keyword based on the formed populations;
the processor configured to extract a change keyword included in both populations as a co-occurrence word among the extracted change keywords in a combination of a company and a customer and a combination of the company and a competitor, the company, the customer, and the competitor being elements of the 3C; and
the processor coupled with a user interface configured to output text including the extracted co-occurrence word in association with one of the combination of the company and the customer and the combination of the company and the competitor,
wherein the population is a set of text and words, and
wherein, in each population,
the text includes a predetermined search phrase related to at least one of the customer, the company, and the competitor which are the elements of the 3C, and
a word is a noun extracted from the text in the population, and
wherein the processor is further configured to:
calculate an appearance ratio indicating a rate of a number of each of the extracted words to a total number of the extracted words,
calculate, as a change degree, a rate of an appearance ratio in a second population formed for a second predetermined period that is a relatively short time to an appearance ratio in a first population formed for a first predetermined period that is a relatively long time, and
extract the change keyword from a word in descending order of the change degree as the change keyword that has a large change and is to be noticed in a corporate business proposal.

2. The corporate business support system according to claim 1, wherein
the processor is further configured to:
extract, when there is text including two or more kinds of co-occurrence words, a combination of two kinds of co-occurrence words as a co-occurrence word pair, and
calculate, for each of the extracted co-occurrence word pairs, a co-occurrence probability indicating a rate of the number of pieces of texts including the co-occurrence word pair in all texts including the extracted co-occurrence words.

3. The corporate business support system according to claim 2, wherein, when the extracted co-occurrence word relates to a co-occurrence between text included in the population for the company and text included in the population for the customer, the user interface outputs, in order from text including a co-occurrence word pair having a highest co-occurrence probability, the text as text to be noticed in a corporate business proposal in which interests of the customer and the company coincide.

4. The corporate business support system according to claim 3, wherein, when the extracted co-occurrence word relates to a co-occurrence between text included in the population for the company and text included in the population for the competitor, the user interface outputs text to be noticed in a corporate business which the competitor does not notice, in order from the text including the co-occurrence word pair having the highest co-occurrence probability and the co-occurrence word pair having a lowest co-occurrence probability.

5. The corporate business support system according to claim 1, wherein the text includes a directional keyword that is a predetermined search phrase related to the customer that is an element of the 3C.

6. The corporate business support system according to claim 5, wherein the user interface preferentially presents text including the directional keyword.

7. The corporate business support system according to claim 5, wherein the directional keyword related to the customer includes at least one of a name or an abbreviation of the customer and a term related to an industry to which the customer belongs.

8. The corporate business support system according to claim 1,
wherein the change keyword extraction unit measures a time-series change of the number of appearances or an appearance ratio of the change keyword in each of the populations, and
wherein, when magnitude of the time-series change of the number of appearances or the appearance ratio of the change keyword is equal to or greater than a predetermined threshold, the user interface reports that it is a preferable business implementation time for the text including the change keyword.

9. A corporate business support method comprising:
forming a population for each type of element of 3C (customer, company and competitor) and for each predetermined period by a computer;
extracting a change keyword based on the formed populations by the computer;
extracting a change keyword included in both populations as a co-occurrence word among the extracted change keywords in a combination of a company and a customer and a combination of the company and a competitor, the company, the customer, and the competitor being elements of the 3C by the computer, and
outputting text including the extracted co-occurrence word in association with one of the combination of the company and the customer and the combination of the company and the competitor by the computer,
wherein the population is a set of text and words, and
wherein, in each population, the text includes a predetermined search phrase related to at least one of the customer, the company, and the competitor which are the elements of the 3C, and a word is a noun extracted from the text in the population, and
wherein, in the extracting of the change keyword,
the computer calculates an appearance ratio indicating a ratio of a number of each of the extracted words to a total number of the extracted words,
the computer calculates, as a change degree, a rate of an appearance ratio in a second population formed for a second predetermined period that is a relatively short time to an appearance ratio in a first population formed for a first predetermined period that is a relatively long time, and
the computer extracts the change keyword from a word in descending order of the change degree as the change keyword that has a large change and is to be noticed in a corporate business proposal.

10. A non-transitory computer readable storage medium, storing computer program instructions, wherein when the program instructions are executed cause a computer to execute:
forming a population for each type of element of 3C (customer, company and competitor) and for each predetermined period;
extracting a change keyword based on the formed populations;
extracting a change keyword included in both populations as a co-occurrence word among the extracted change keywords in a combination of a company and a customer and a combination of the company and a competitor, the company, the customer, and the competitor being elements of the 3C; and
outputting text including the extracted co-occurrence word in association with one of the combination of the company and the customer and the combination of the company and the competitor,
wherein the population is a set of text and words, and
wherein, in each population, the text includes a predetermined search phrase related to at least one of the customer, the company, and the competitor which are the elements of the 3C, and a word is a noun extracted from the text in the population, and
wherein, in the extracting of the change keyword,
an appearance ratio indicating a ratio of a number of each of the extracted words to a total number of the extracted words is calculated,
a rate of an appearance ratio in a second population formed for a second predetermined period that is a relatively short time to an appearance ratio in a first population formed for a first predetermined period that is a relatively long time is calculated as a change degree, and
the change keyword is extracted in descending order of the change degree as the change keyword that has a large change and is to be noticed in a corporate business proposal.

* * * * *